United States Patent
Nakamura et al.

(10) Patent No.: US 6,418,249 B1
(45) Date of Patent: Jul. 9, 2002

(54) OPTICAL MULTIPLEXER/DEMULTIPLEXER

(75) Inventors: Shiro Nakamura; Takeshi Nakajima; Kanji Tanaka, all of Ichihara (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/581,523

(22) PCT Filed: Oct. 26, 1999

(86) PCT No.: PCT/JP99/05908

§ 371 (c)(1),
(2), (4) Date: Jul. 6, 2000

(87) PCT Pub. No.: WO00/28357

PCT Pub. Date: May 18, 2000

(30) Foreign Application Priority Data

Nov. 6, 1998 (JP) .......................................... 10-315828

(51) Int. Cl.⁷ ............................................... G02B 6/28
(52) U.S. Cl. .............................. 385/24; 385/27; 385/37; 385/39
(58) Field of Search .............................. 385/24, 27, 31, 385/37, 39, 46, 49, 50, 129, 130

(56) References Cited

U.S. PATENT DOCUMENTS 5,745,619 A * 4/1998 Li et al. ........................ 385/48
5,982,960 A * 11/1999 Akiba et al. ................... 385/24
6,069,990 A * 5/2000 Okawa et al. ................. 385/43

FOREIGN PATENT DOCUMENTS

| JP | 7-63934 | * | 3/1995 |
| JP | 9-49936 | * | 2/1997 |

* cited by examiner

Primary Examiner—Rodney Bovernick
Assistant Examiner—Juliana K. Kang
(74) Attorney, Agent, or Firm—Oblon, Spivak, McClelland, Maier & Neustadt, P.C.

(57) ABSTRACT

An optical multiplexer/demultiplexer including an arrayed waveguide grating having a plurality of waveguides and formed at its both end with an input-side slab waveguide and an output-side slab waveguide. A reference input waveguide and correction input waveguides are provided on the input end face of the input-side slab waveguide and a plurality of output waveguides are connected to the output end face of the output-side slab waveguide. The correction input waveguide has an output end face thereof placed apart by a distance from the input end face of the input-side slab waveguide in the lengthwise direction of the slab waveguide and has an acute angle to a plane perpendicular to the optical axis of this waveguide, thus permitting an optical signal to be input at a position apart from a light-incident position for the reference input waveguide by a distance shorter than a waveguide disposition interval, thereby optimally correcting a deviation of the center wavelength of the optical signal.

8 Claims, 4 Drawing Sheets

OPTICAL MULTIPLEXER/DEMULTIPLEXER

TECHNICAL FIELD

The present invention relates to an optical multiplexer/demultiplexer having an arrayed waveguide grating, and, more particularly, to an optical multiplexer/demultiplexer capable of correcting a deviation of the wavelength of multiplexed/demultiplexed optical signal.

BACKGROUND ART

In optical wavelength (optical frequency) division multiplexing systems simultaneously transmitting signal beams having different wavelengths (frequencies) set at narrow wavelength intervals to thereby significantly increase the transmission capacity of optical transmission line, a plurality of optical signals are multiplexed by means of the multiplexing function of an optical multiplexer/demultiplexer on the transmitter side and wavelength-multiplexed light signal beam is demultiplexed to original optical signals by the demultiplexing function of an optical multiplexer/demultiplexer on the receiver side. This type of optical multiplexer/demultiplexer uses a grating to demultiplex wavelength-multiplexed light signal beams. Due to the limited diffraction order, however, the conventional grating can not sufficiently disperse wavelength-multiplexed light signal beam and has a difficulty in demultiplexing wavelength-multiplexed light signal beam into a plurality of optical signals when the wavelength intervals of the optical signals are narrow. In this respect, for example, an optical multiplexer/demultiplexer using an arrayed waveguide grating is used in the multiplexing of optical signals and demultiplexing of multiplexed light signal beam.

Figure 4:
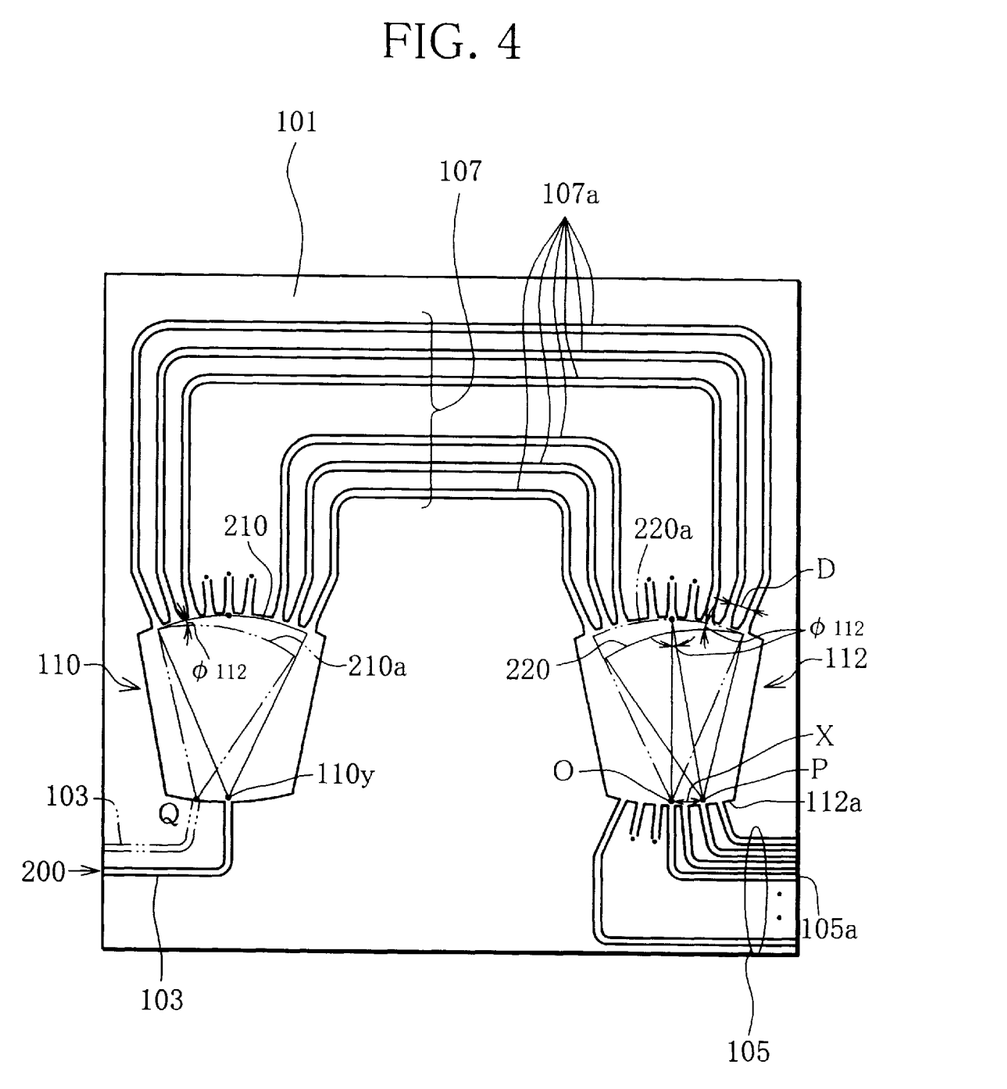
FIG. 4 is a schematic plan view showing a conventional arrayed waveguide grating optical multiplexer/demultiplexer.

As shown in FIG. 4, this type of optical multiplexer/demultiplexer has slab waveguides 110 and 112 connected to both ends of an arrayed waveguide grating 107, so that wavelength-multiplexed light signal beam 200 input from an input waveguide 103 is demultiplexed into a plurality of optical signals which are taken out of a plurality of output waveguides 105. Reference numeral 101 indicates a substrate.

Specifically, the input-side slab waveguide 110 is comprised of a two-dimensional waveguide which has an effect of optical confinement in the vertical direction, and has an input end face (end face on the input waveguide side) and an output end face (end face on the grating side) thereof formed in arc shapes as viewed in a horizontal plane. The center of curvature 110y of the output end face of the input-side slab waveguide 110 coincides with the center 110y of the input end face of the slab waveguide 110. The input waveguide 103 is connected to the input end face of the input-side slab waveguide 110 at the center of curvature 110y. The input ends of a plurality of channel waveguides 107a which constitute the arrayed waveguide grating 107 are connected to the output end face of the slab waveguide 110 at intervals in the widthwise direction of the output end face.

The wavelength-multiplexed signal beam introduced into the input-side slab waveguide 110 from the input waveguide 103 is dispersed in the input-side slab waveguide. Dispersed optical signal waves reach the output end face of the slab waveguide 110 at the equal phase. In FIG. 4, reference numeral 210 indicates the equi-phase plane.

The output-side slab waveguide 112 is comprised of a two-dimensional waveguide which demonstrates optical confinement in the vertical direction, and has an input end face (end face on the grating side) and an output end face (end face on the output waveguide side) thereof formed in arc shapes as viewed in a horizontal plane. The center of curvature O of the input end face coincides with the center O of the output end face. The further outward a waveguide in the plurality of channel waveguides 107a is located, the longer the waveguide length becomes. The output ends of the channel waveguides 107a are connected to the input end face of the output-side slab waveguide 112 at intervals in the widthwise direction of the input end face.

As the waveguide lengths of the channel waveguides 107a of the grating 107 differ from one another, the optical signal waves that have propagated in the respective channel waveguides 107a have different phases from one another at the output of the grating 117. These optical signal waves are dispersed in the output-side slab waveguide 112 and are focused on the widthwise positions different according to the wavelengths on the output end face of the output-side slab waveguide.

The arrayed waveguide grating type optical multiplexer/demultiplexer satisfies the following equation (1).

$$n_s \cdot D \cdot \sin \phi_{112} + n_c \cdot \Delta L = m\lambda \qquad (1)$$

where the symbol $\phi_{112}$ represents the diffraction angle of light in the output-side slab waveguide 112, $\lambda$ is the wavelength, $n_s$ is the refractive index of the slab waveguide 112, $n_c$ is the refractive index of the channel waveguides 107a, $\Delta L$ is the difference between waveguide lengths of the adjacent channel waveguides 107a, D is the interval of the channel waveguides 107a on the input end face of the slab waveguide 112, and m (integer) is the diffraction order.

The optical signal wave having the wavelength (center wavelength $\lambda_M$) thereof exhibiting the diffraction angle $\phi_{112}$ of zero has an equi-phase plane 220a which extends along the input end face of the output-side slab waveguide 112. Because the input end face of the slab waveguide 112 is formed in an arc whose center of curvature is located at the center O of the output end face of the slab waveguide 112, the optical signal having the center wavelength $\lambda_M$ is focused on the center of the output end face. The optical signal having the wavelength (center wavelength $\lambda_M$) thereof exhibiting the diffraction angle $\phi_{112}$ ($\neq 0$) has an equi-phase plane 220 inclined by an angle $\phi_{112}$ counterclockwise in FIG. 4 with respect to the equi-phase plane 220a associated with the center wavelength $\lambda_M$. Therefore, this optical signal is focused on a position P on the output end face of the output-side slab waveguide 112, which position is shifted in the widthwise direction from the center O of the output end face. That is, the optical signal focusing position P changes depending on the diffraction angle $\phi_{112}$. In other words, the distance X between the center O of the output end face of the output-side slab waveguide 112 and the focusing position P differs according to the wavelength $\lambda$.

When the diffraction angle $\phi_{112}$ (hereinafter referred to as "$\phi$") is small, $\sin \phi \approx \phi$, so that modifying the equation (1) yields the following equation.

$$n_s \cdot D \cdot \phi + n_c \cdot \Delta L = m \cdot \lambda$$

Solving this equation with respect to $\phi$, we obtain $$\phi = (m \cdot \lambda - n_c \cdot \Delta L)/(n_s \cdot D).$$

Differentiating both sides of the above equation with respect to $\lambda$ yields $$(d\phi/d\lambda) = [\{m - (dn_c/d\lambda) \cdot \Delta L\} \cdot n_s - \{m \cdot \lambda - n_c \cdot \Delta L) \cdot (dn_s/d\lambda)\}]/\{(n_s)^2 \cdot D\}.$$

In the vicinity of the center wavelength $\lambda_M$, the following is satisfied.

$$\lambda = \lambda_M = (n_c \cdot \Delta L)/m$$

Thus, the following relationship is met.

$$\Delta L = (m \cdot \lambda_M)/n_c$$

Substituting the above relationship in the right-hand side of the above equation about $(d\phi/d\lambda)$, yielding $$(d\phi/d\lambda) = (\Delta L/n_s \cdot D \cdot \lambda_M) \times \{n_{c-\lambda_M} \cdot (dn_c/d\lambda)\}$$

By expressing the radius of curvature of the input end face of the output-side slab waveguide as $f_o$, the dispersion $dX/d\lambda$ of the distance X with respect to the wavelength $\lambda$ is given by the following equation (2).

$$dX/d\lambda = f_O \cdot (d\phi/d\lambda) \quad (2)$$
$$= \{(f_O \cdot \Delta L)/(n_S \cdot D \cdot \lambda_M)\} \times \{n_C - \lambda_M \cdot (dn_C/d\lambda)\}$$

The above equation (2) indicates that the demultiplexed optical signal whose wavelength differs from the center wavelength $\lambda_M$ by $d\lambda$ is taken out of the output waveguide 105 connected to the output-side slab waveguide at the position apart by the distance dX from the center O of the output end face of the output-side slab waveguide.

However, the core width and refractive index of each channel waveguide may differ from the designed values due to the production errors. In this case, the center wavelength of optical signal to be multiplexed/demultiplexed deviates from the designed value, raising such a problem that the wavelengths of the optical signals to be taken out of a plurality of output waveguides of the optical multiplexer/demultiplexer deviates from the desired wavelengths.

The arrayed waveguide grating type optical multiplexer/demultiplexer has such a characteristic that the loss is very small at the time of multiplexing/demultiplexing optical signal whose wavelength lies in a narrow wavelength range, raising such a problem that when the center wavelength of multiplexed/demultiplexed optical signal deviates from the desired wavelength, a loss occurs at the time of multiplexing/demultiplexing optical signal so that the optical signal is attenuated while multiplexing/demultiplexing is repeated.

To overcome such a problem, a technique is proposed which corrects the deviation of the center wavelength using an input waveguide and output waveguide for correction, respectively connected to the positions shifted from the center of the input end face of the input-side slab waveguide (the center of curvature of the output end face) and the center of the output end face of the output-side slab waveguide (the center of curvature of the input end face). (See Japanese Unexamined Patent Publication (KOKAI) No. 9-49936.) According to this technique, when the focusing position of optical signal with the center wavelength is shifted to P from O in FIG. 4, for example, the wavelength-multiplexed optical signal is input to the slab waveguide 110 via the correction input waveguide 103 connected to the position shifted from the center of the input end face of the input-side slab waveguide 110 as indicated by the two-dot chain line in FIG. 4 and the wavelength-multiplexed light is dispersed in the slab waveguide 110. An equi-phase plane 210a (indicated by the two-dot chain line in FIG. 4) of the dispersed optical signal is inclined by the angle $\phi_{112}$ clockwise in FIG. 4 with respect to the equi-phase plane 210 in the case where wavelength-multiplexed optical signal is input to the center 110y of the input end face. At the output of the arrayed waveguide grating 107, therefore, the optical signal that has the center wavelength $\lambda_M$ has the equi-phase plane 220a inclined by the angle $\phi_{112}$ clockwise with respect to the equi-phase plane 220 in the case where wavelength-multiplexed optical signal is input to the center of the input end face of the input-side slab waveguide 110, and is thus focused on the center O of the output end face of the output-side slab waveguide 112.

As described above, the proposed technique provides a correction amount enough to cancel out the deviation of the center wavelength, originated from the deviation of the equi-phase plane of the optical signal wave that propagates in the output-side slab waveguide, at the incident position of wavelength-multiplexed optical signal and hence at the equi-phase plane of the optical signal wave that propagates in the input-side slab waveguide, thereby correcting the deviation of the center wavelength of the multiplexed/demultiplexed optical signal (the deviation of the condensing position of the optical signal wave that has the center wavelength).

While the amount of the deviation of the center wavelength takes an arbitrary value which depends on the production errors of the optical multiplexer/demultiplexer, however, the interval between the locations of the correction input and output waveguides is limited. That is, the intervals between the correction waveguides and the reference waveguide and the interval between the correction waveguides should be made larger than the allowable minimum interval that prevents the crosstalk characteristic from being degraded by coupling (crosstalk) of optical signals respectively transmitted through adjacent waveguides. According to the proposed technique, therefore, the minimum amount of correction of the deviation of the center wavelength is limited by the interval between the adjacent waveguides that is least necessary to avoid the degradation of the crosstalk characteristic caused by the optical coupling between the waveguides, thus disabling the optimal correction of the deviation of the center wavelength.

DISCLOSURE OF THE INVENTION

It is therefore an object of the present invention to provide an arrayed waveguide grating type optical multiplexer/demultiplexer which can ensure the optimal correction of the deviation of the wavelength of multiplexed/demultiplexed optical signal by eliminating the restriction to the amount of correction of the wavelength deviation while securing the interval between waveguides that can avoid optical coupling between the waveguides, and can thus significantly reduce the wavelength deviation.

To achieve the above object, this invention provides an optical multiplexer/demultiplexer having a substrate on which an arrayed waveguide grating comprising a plurality of waveguides having waveguide lengths different from one another, first and second slab waveguides respectively connected to both ends of the grating, a plurality of first waveguides adapted to output optical signal toward the first slab waveguide and a plurality of second waveguides adapted to receive optical signals output from the second slab waveguide are formed. The optical multiplexer/demultiplexer is characterized in that at least one of the plurality of first waveguides has a slab-waveguide-side end face thereof placed apart from a first-waveguide-side end face of the first slab waveguide and obliquely extending at an acute angle to an optical axis of the first waveguide as viewed in a plane.

According to this invention, the optical signal that is output from the first waveguide having an oblique end face apart from the end face of the first slab waveguide is refracted at the oblique end face and travels in the oblique direction toward the first slab waveguide. The signal beams from the first waveguide enter the end face of the first slab waveguide at the position close to or apart from another first waveguide as seen in the widthwise direction of the first slab waveguide from the position where the optical axis of the first waveguide intersects the end face of the first slab waveguide. The incident position of the optical signals changes mainly in accordance with the distance between the oblique end face of the first waveguide and the opposing end face of the first slab waveguide, the angle formed by the oblique end face and the optical axis of the first waveguide, the refractive index of the optical transmission medium between the oblique end face of the first waveguide and the opposing end face of the first slab waveguide, and the refractive index of the first waveguide, which indexes define the incident angle and the refraction angle at the oblique end face.

Anyway, the optical signal incident positions to the end face of the first slab waveguide from the first waveguide having the oblique end face are deviated from the position where the optical axis of the first waveguide intersects the end face of the first slab waveguide. Therefore, the interval between the optical signal incident position to the first slab waveguide from the first waveguide having the oblique end face and the optical signal incident position to the first slab waveguide from another first waveguide differs from the interval between two intersection positions at which the optical axes of the first waveguides and the end face of the first slab waveguide intersect (the disposition interval between those first waveguides at the end face of the first slab waveguide).

In the optical multiplexer/demultiplexer, the optical signals that enter the second slab waveguide from the first waveguides via the first slab waveguide and the arrayed waveguide grating are focused on positions on the second-waveguide-side end face of the second slab waveguide which differ from one wavelength to another. These focused positions vary also in accordance with the optical signal incident positions to the waveguide-side end face of the first slab waveguide from the first waveguides. In other words, at the time optical signals are incident to the first slab waveguide, a deviation of the wavelength of the optical multiplexer/demultiplexer can be corrected by using, instead of using the first waveguide having the oblique end face, another first waveguide or using the former one in place of the latter one, so that the interval between the light incident positions to the first slab waveguide from the first waveguide having the oblique end face and another first waveguide corresponds to the amount of correction of the center wavelength in the optical multiplexer/demultiplexer.

That the interval between the optical signal incident positions to the first slab waveguide from these two first waveguides differs from the disposition interval between both the waveguides indicates that the amount of correction of the center wavelength is not restricted by the disposition interval between the waveguides. That is, the amount of correction of the center wavelength deviation can be made smaller or greater than the value that corresponds to the disposition interval between the first waveguides by properly setting the distance between the oblique end face of the first waveguide and the end face of the first slab waveguide and the angle at which the oblique end face extends. In this manner, according to this invention, the amount of correction of the center wavelength can be set without a restriction by the disposition interval between the first waveguides. It is therefore possible to optimally correct a deviation of the center wavelength and provide a low-loss optical multiplexer/demultiplexer with a high yield.

Preferably, the plurality of first waveguides include a plurality of first waveguides for correcting a wavelength deviation, provided on both sides of the first waveguide serving as a reference as seen in the widthwise direction of the first-waveguide-side end face of the first slab waveguide. With this preferred arrangement, in a case where the wavelength becomes higher or lower than the desired wavelength due to the wavelength deviation, the wavelength deviation can be corrected by using the proper one of the plurality of first waveguides for correcting a wavelength deviation.

According to this invention, the at least one first waveguide for correcting a wavelength deviation has a slab-waveguide-side end face placed apart from the first-waveguide-side end face of the first slab waveguide and obliquely extending at an acute angle to the optical axis of the first waveguides as viewed in a plane. That side of the slab-waveguide-side end face of the first waveguide for correcting a wavelength deviation which is closer to the first waveguide serving as a reference as seen in the widthwise direction of the first slab waveguide is closer to the first-waveguide-side end face of the first slab waveguide as seen in the lengthwise direction of the first slab waveguide.

As already described, according to the conventional arrayed waveguide grating type optical multiplexer/demultiplexer, the interval between the optical signal incident positions from the reference and correction input waveguides, i.e., the amount of correction of the center wavelength is restricted by the disposition interval between the input waveguides. This makes it difficult to reduce the minimum amount of correction of the deviation of the center wavelength from the viewpoint of preventing the deteriorated optical multiplexing/demultiplexing characteristics caused by optical coupling between input waveguides.

On the contrary, according to the preferred arrangement of this invention, even when the first waveguides are arranged at intervals wide enough to avoid the crosstalk interference in the optical multiplexing/demultiplexing characteristics, it is possible to adequately set the intervals between the optical signal incident position to the first slab waveguide from the reference first waveguide and the optical signal incident positions to the first slab waveguide from the correction first waveguides, thereby making sufficiently smaller the minimum value of the amount of correction of the inclination of the equi-phase plane of the optical signal wave that propagates in the first slab waveguide, whereby the minimum value of the amount of correction of the deviation of the center wavelength can be made sufficiently smaller. This can ensure optimal correction of the deviation of the center wavelength.

In the case where a plurality of first waveguides for correcting a wavelength deviation are provided, particularly, the amount of correction of the wavelength deviation attained by these first waveguides for correction can be substantially continuously varied by properly setting the distances between the first waveguides for correction and the first waveguide for reference as seen in the widthwise direction of the first slab waveguide, the distances between the first waveguides for correction and the end face of the first slab waveguide as seen in the lengthwise direction of the first slab waveguide, the angle of the oblique end face, etc. As a result, regardless of how much the amount of deviation of the center wavelength is, it is possible to significantly reduce the deviation of the center wavelength to minimize the amount of the deviation, preferably substantially to zero by selecting the proper correction waveguide to minimize the amount of the wavelength deviation, preferably to make a correction to cancel out the wavelength deviation. This can improve the loss characteristic of the optical multiplexer/demultiplexer and the production yield.

Although the foregoing description has mainly explained the demultiplexing function to cause the optical signals (wavelength-multiplexed optical signals) to be incident from the first waveguides to the first slab waveguide and cause optical signals having different wavelengths to be taken out of a plurality of second waveguides, the optical multiplexer/demultiplexer of this invention also demonstrates the multiplexing function to cause optical signals to be incident to a plurality of second waveguides and cause wavelength-multiplexed optical signals taken out of the first waveguides, as apparent from the principle of reciprocity of this optical multiplexer/demultiplexer.

BEST MODE FOR CARRYING OUT THE INVENTION

The basic structure of an arrayed waveguide grating optical multiplexer/demultiplexer according to a preferred embodiment of the present invention will be described with reference to FIG. 1.

Figure 1:
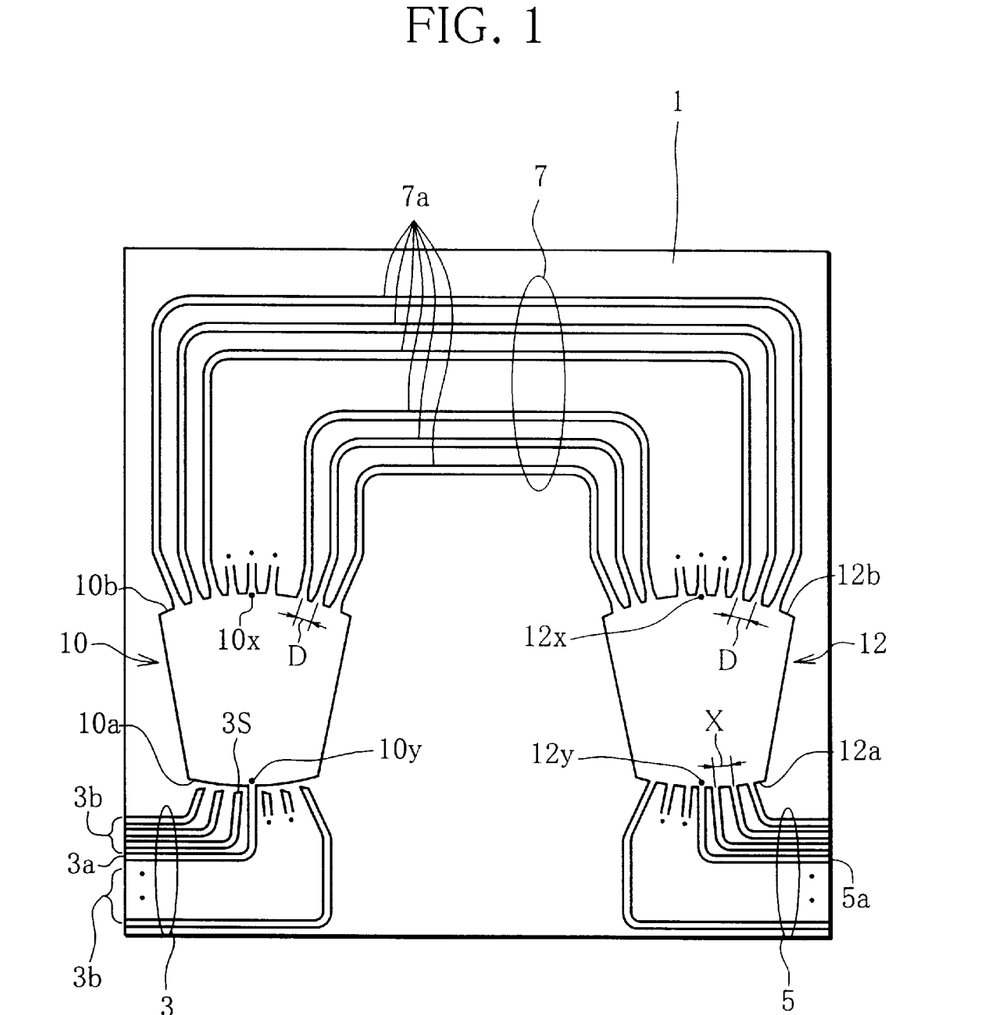
FIG. 1 is a schematic plan view exemplifying the basic structure of an arrayed waveguide grating optical multiplexer/demultiplexer according to a preferred embodiment of this invention.

As shown in FIG. 1, the optical multiplexer/demultiplexer has a substrate 1 on which input waveguides 3, an input-side slab waveguide 10, an arrayed waveguide grating 7 comprising a plurality of channel waveguides 7 a whose waveguide lengths become longer toward outer ones, an output-side slab waveguide 12, and a plurality of output waveguides 5. The output end face 10b of the input-side slab waveguide 10 is connected to the input side of the arrayed waveguide grating 7, the output side of the arrayed waveguide grating 7 is connected to the input end face 12b of the output-side slab waveguide 12, and the output end face 12a of the output-side slab waveguide 12 is connected to the output waveguides 5.

The substrate 1 is formed of, for example, silicon or a glass material. The input waveguides 3, the channel waveguides 7a and the output waveguides 5 are of a ridge type which can be fabricated by, for example, forming a ridge portion, having a higher refractive index than that of a lower cladding layer and forming a core, on the lower cladding layer and then forming upper cladding layers on the core. Various optical materials, such as quartz-based glass, can be used for the upper and lower cladding layers and the core.

The input waveguides 3 comprise a reference input waveguide 3a having an output end face thereof connected to the center (more generally, the center portion) of the input end face 10a of the input-side slab waveguide 10 and, for example, six input waveguides 3b for correcting a wavelength deviation located on both sides of the reference input waveguide 3a as seen in the widthwise direction of the input end face 10a of the slab waveguide 10. The output end faces 3s of the correction input waveguides 3b are placed apart from the input end face 10a of the slab waveguide 10 in the lengthwise direction of the slab waveguide and obliquely extends at an acute angle to the optical axes of the waveguides 3b as viewed in a horizontal plane. As will be discussed later, the correction input waveguide 3b acts to tilt the equi-phase plane of optical signal entering to the slab waveguide 10 from this waveguide 3b with respect to the equi-phase plane of optical signal entered from the waveguide 3a, thereby correcting a wavelength deviation.

The input-side slab waveguide 10 and the output-side slab waveguide 12 are two-dimensional waveguides which demonstrate optical confinement only in the direction perpendicular to the substrate 1. For these slab waveguides, the same materials as used for the aforementioned core can be used.

The input end face 10a and the output end face 10b of the input-side slab waveguide 10 are formed in arc shapes as viewed in a horizontal plane. The center of curvature 10y of the input end face 10a coincides with the center of the output end face 10b, and the center of curvature 10x of the output end face 10b coincides with the center of the input end face 10a. Likewise, input end face 12b of the output-side slab waveguide 12 is formed in an arc shape as viewed in a horizontal plane and has the center of curvature 12x thereof coinciding with the center of the output end face 12a, and the output end face 12a is formed in an arc shape as viewed in a horizontal plane and has the center of curvature 12y thereof coinciding with the center of the input end face 12b. As the slab waveguides 10 and 12 have arcuate input and output end faces, it is possible to adequately control the phase planes of signal beams that enter and come out of the channel waveguides 7a of the grating 7 via the slab waveguides. The arc length of the output end face 10b of the input-side slab waveguide 10 is longer than the arc length of the input end face 10a, and the arc length of the input end face 12b of the output-side slab waveguide 12 is longer than the arc length of the output end face 12a. The interval between the channel waveguides 7a at the connecting portions between the slab waveguides 10 and 12 and the grating 7 is D.

The plurality of output waveguides 5 are connected to the output end face 12a of the output-side slab waveguide 12, and the interval between the output waveguides 5 at the connecting portions between the slab waveguide 12 and the output waveguides 5 is x. The optical signal with the center wavelength is output from an output waveguide 5a which is connected to the slab waveguide 12 at the center of the output end face 12a of the slab waveguide 12 (the center of curvature 12y of the input end face 12b).

In this invention, an input waveguide means a waveguide which transmits wavelength-multiplexed signal beams and an output waveguide means a waveguide which transmits single-wavelength optical signal that is obtained by demultiplexing wavelength-multiplexed signal beam. From the principle of reciprocity (reversibility), this multiplexer/demultiplexer is applicable not only to the case where signal beams are transmitted from the input waveguide to the output waveguides to be demultiplexed but also to a case where single-wavelength optical signals transmitted from the output waveguides are multiplexed and the resultant wavelength-multiplexed signal beams are taken out of the input waveguide.

The optical multiplexer/demultiplexer of this invention will be described in detail by referring to FIG. 2.

Figure 2:
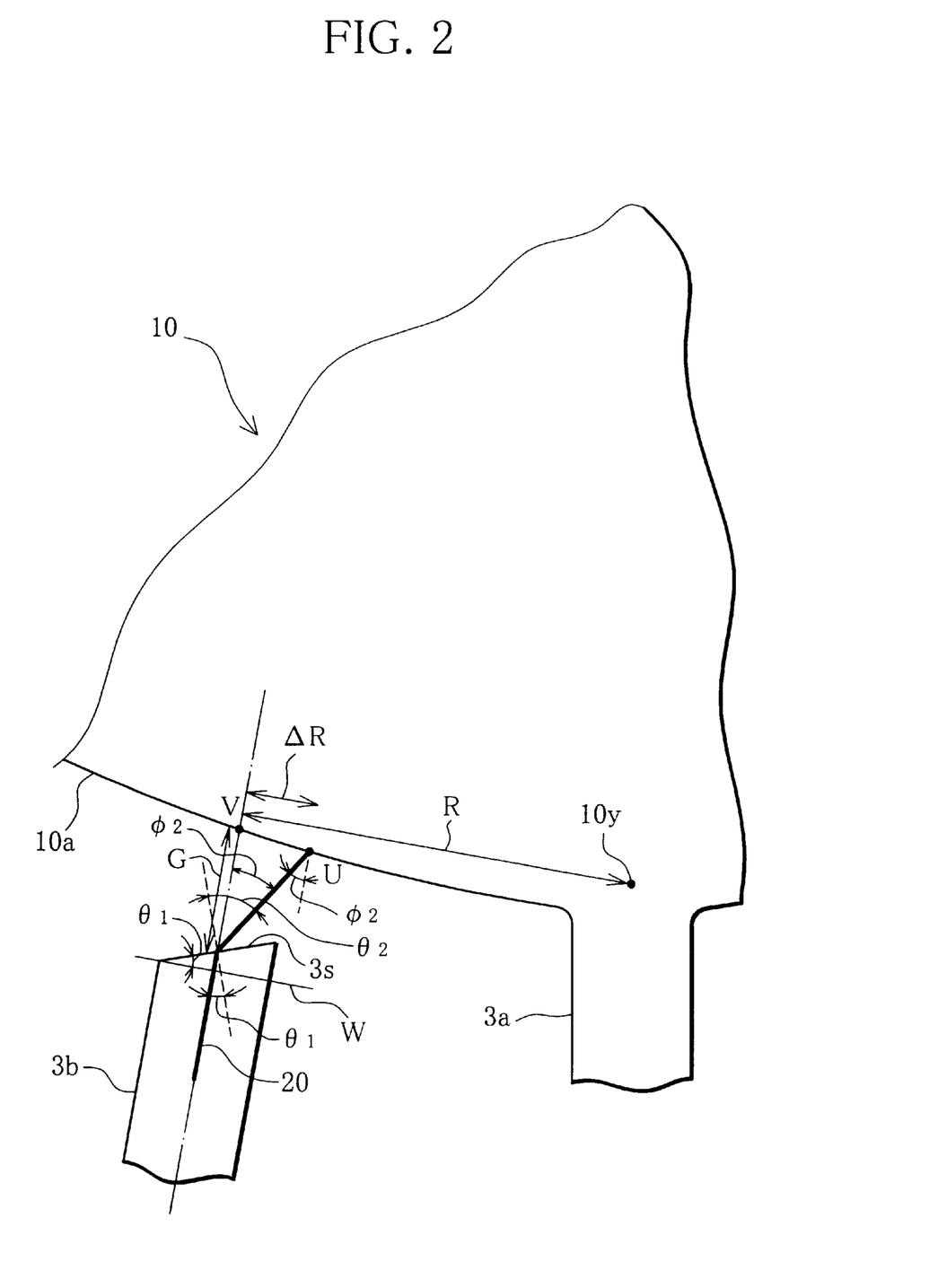
FIG. 2 is a fragmentary enlarged view showing the propagation of optical signal in the vicinity of the input waveguide of the optical multiplexer/demultiplexer shown in FIG. 1.

In FIG. 2, the output end face of the reference input waveguide 3a is connected to the input end face 10a of the input-side slab waveguide 10. By contrast, each of the wavelength-deviation correcting input waveguides 3b (FIG. 1) arranged on both sides of the reference input waveguide 3a as seen in the widthwise direction of the input end face 10a of the slab waveguide 10 has the output end face 3s thereof connected to the input end face 10a of the slab waveguide 10 via an optical transmission medium formed of, for example, the upper cladding layer. That is, the output end face 3s of the correction input waveguide 3b is located apart from the input end face 10a of the slab waveguide 10. FIG. 2 shows that one of the plurality of correction input waveguides 3b which is adjacent to the left to the reference input waveguide 3a as viewed in a horizontal plane.

This correction input waveguide 3b is arranged in such a way that its optical axis intersects the input end face 10a of the slab waveguide 10 at a position V apart by a predetermined distance R from the center of the connecting portion between the reference input waveguide 3a and the slab waveguide 10 as seen in the widthwise direction of the input end face 10a of the input-side slab waveguide 10. The distance R is set to a value corresponding to the wavelength interval Δλ of optical signals to be multiplexed or demultiplexed. The symbol G indicates the distance of separation between the output end face 3s of the waveguide 3b and the input end face 10a of the slab waveguide 10 in the direction of the optical axis. The output end face 3s of the correction input waveguide 3b extends at a predetermined angle $\phi_1$ ($0°<\theta_1<90°$) with respect to a vertical plane W extending perpendicularly to the optical axis of the waveguide 3b and extending along the input end face 10a of the slab waveguide 10. (Given that the counterclockwise direction is positive in FIG. 3, $\theta_1$ takes a positive value.) In other words, the output end face 3s extends at an acute angle ($90°-\theta_1$) to the optical axis of the waveguide 3b as viewed in a horizontal plane. Further, the closer (rightward) to the reference input waveguide 3a the output end face 3s is located as seen in the widthwise direction of the slab waveguide 10, the closer the output end face 3s becomes to the input end face 10a of the slab waveguide 10 in the lengthwise direction of the slab waveguide 10.

Wavelength-multiplexed signal beams 20 (the center wavelength $\lambda_M$) transmitted through the correction input waveguide 3b enters the cladding layer on the output end face 3s of the waveguide 3b at an incident angle $\theta_1$, propagates in the cladding layer at a diffraction angle $\theta_2$, then goes into a point U on the input end face 10a of the slab waveguide 10 at an incident angle $\phi_2$ and propagates in the input-side slab waveguide 10. At this time, the signal beam entering position U to the input-side slab waveguide 10 is located more on the side of the reference input waveguide 3a by a distance ΔR given by the following equation (3) than a position V where the optical axis of the waveguide 3b intersects the input end face 10a of the slab waveguide 10 as seen in the widthwise direction of the slab waveguide 10.

$$\Delta R = G \times \tan\phi_2 = G \times \tan(\theta_2 - \theta_1) \quad (3)$$

The incident angle $\theta_1$ and diffraction angle $\theta_2$ of wavelength-multiplexed signal beams at the output end face 3s of the waveguide 3b, the refractive index $n_1$ of the waveguide 3b and the refractive index $n_2$ of the cladding layer satisfy a relationship expressed by the following equation.

$$\theta = \sin^{-1}\{(n_1/n_2) \times \sin\theta_1\}$$

The value of the distance ΔR from the position where the optical axis of the correction input waveguide 3b intersects the input end face 10a of the slab waveguide 10 to the signal beam entering position U is determined in accordance with the values of the aforementioned parameters $\theta_1$, $n_1$, $n_2$ and G. Therefore, the distance ΔR can substantially be varied continuously by properly changing the inclination angle $\theta_1$ of the output end face 3s of the waveguide 3b, the refractive index $n_1$ of the waveguide 3b, the refractive index $n_2$ of the cladding layer and the separation distance G between the output end face 3s of the waveguide 3b and the input end face 10a of the slab waveguide 10. The distance ΔR represents the amount of correction for the signal beam entering position by means of the above-described structure comprised of the oblique output end face 3s of the correction input waveguide 3b and the constituents located between the output end face 3s and the input end face 10a of the slab waveguide 10. As the amount of correction ΔR of the signal beam entering position is variable in this manner, it is possible to adequately set the interval (R−ΔR) between the incident positions of signal beams from the reference input waveguide 3a and from the correction input waveguides 3b, i.e., the amount of correction of a wavelength deviation, without being restricted by the interval between the waveguides 3a and 3b.

The innermost correction input waveguide 3b adjacent to the left to the reference input waveguide 3a in FIG. 1 is provided apart from the reference input waveguide 3a to the left by the distance R as mentioned above, and inputs signal beams at a position apart from the reference input waveguide 3a to the left by the distance (R−ΔR). The intermediate correction input waveguide 3b is provided to the left to this innermost waveguide 3b by the same distance as the distance R or a distance different therefrom in the widthwise direction of the input end face of the slab waveguide. The leftmost correction input waveguide 3b is provided to the left to this intermediate waveguide 3b by the same distance as the distance R or a distance different therefrom. The angle $\theta_1$ of the output end face, the separation distance G and the refractive indexes $n_1$ and $n_2$ for each of the intermediate and leftmost waveguides 3b can be set to the same values as or different values from those of the parameters $\theta_1$, G, $n_1$ and $n_2$ for the innermost waveguide 3b.

The innermost correction input waveguide 3b adjacent to the right to the reference input waveguide 3a is provided apart from the reference input waveguide 3a to the right by the same distance as or a different distance from the distance R, and inputs signal beams at a position apart from the reference input waveguide 3a to the right by the same distance as or a different distance from the distance (R−ΔR). The intermediate correction input waveguide 3b is provided to the right to this innermost waveguide 3b by the same distance as the distance R or a distance different therefrom in the widthwise direction of the input end face of the slab waveguide. The rightmost correction input waveguide 3b is provided to the right to this intermediate waveguide 3b by the same distance as the distance R or a distance different therefrom. The angle $\theta_1$ of the output end face, the separation distance G and the refractive indexes $n_1$ and $n_2$ for those three waveguides 3b can be set to adequate values. When the angle $\theta_1$ of the output end face of the correction input waveguide 3b to the left to the reference input waveguide 3a is set as to be a positive value (the counterclockwise direction being positive in FIG. 3), it is generally preferable to set the angle $\theta_1$ of the output end face of the correction input waveguide 3b to the right to the reference input waveguide 3a to be a negative value.

Figure 3:
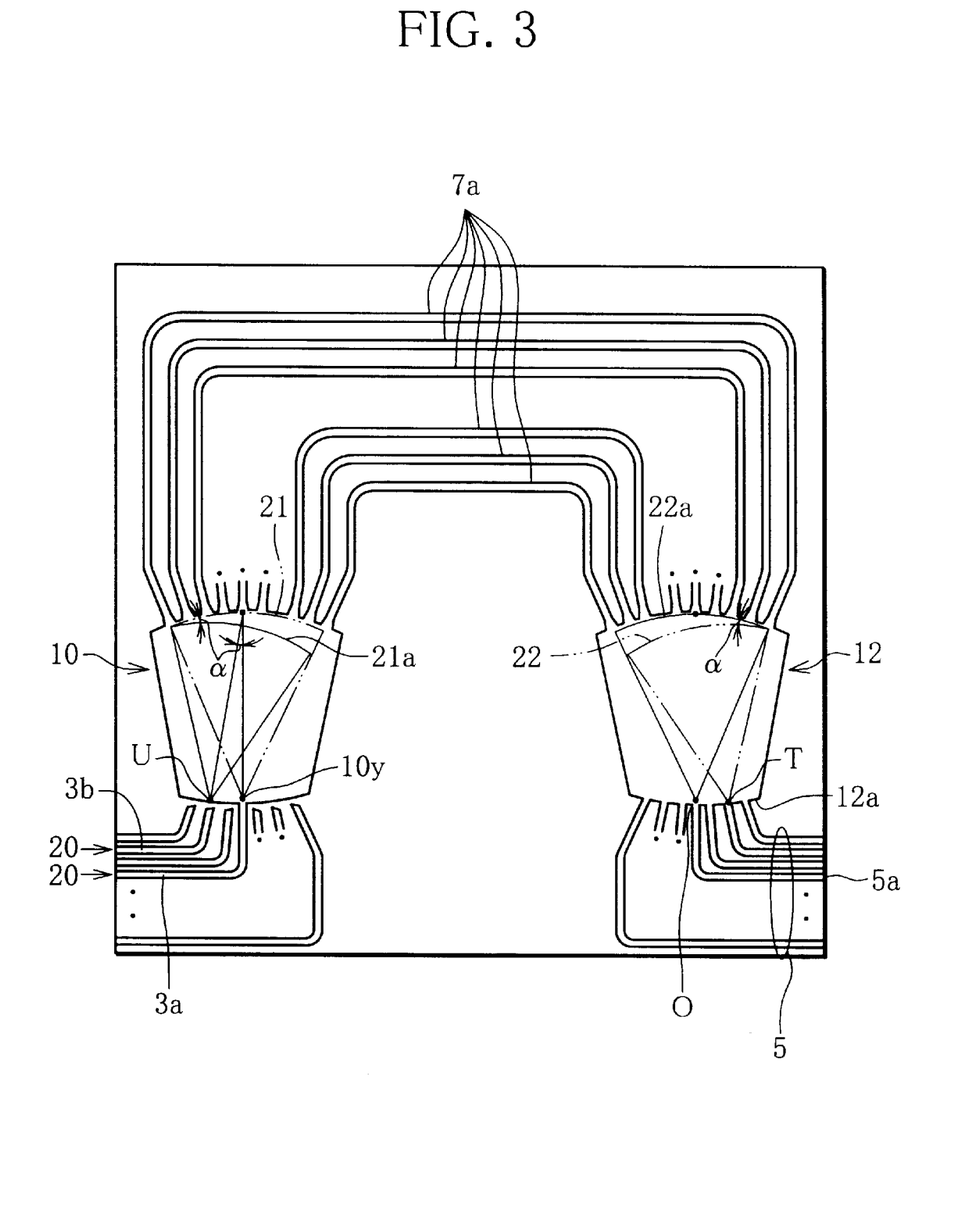
FIG. 3 is a diagram illustrating the principle of correcting a deviation of the center wavelength by the optical multiplexer/demultiplexer shown in FIGS. 1 and 2.

Referring to FIG. 3, a description will now be given of a deviation of the center wavelength in the above optical multiplexer/demultiplexer and a method of correcting it.

In FIG. 3, the optical multiplexer/demultiplexer disperses wavelength-multiplexed signal beams input via the reference input waveguide 3a and condenses the signal beams with the center wavelength on the center of the output end face 12a of the output-side slab waveguide 12 (the center of curvature of the input end face 12b). The center wavelength may deviate as a result of production errors. In this case, the center-wavelength optical signal is focused at, for example, a position T shifted to the right from the center O of the output end face of the output-side slab waveguide 12. A deviation of the center wavelength (hereinafter indicated by a symbol $\delta\lambda_o$) caused by such a deviation of the focused position can be corrected by causing optical beams from the correction input waveguide 3b to be incident to the input end face 10a of the input-side slab waveguide 10 at the position U shifted from the center of the input end face 10y (the center of curvature of the output end face 10b) to the left. The reason for it will be discussed below.

As described in association with the equation (2), when the diffraction angle $\phi$ is small and the wavelength $\lambda$ is in the vicinity of the center wavelength $\lambda_M$, the dispersion $dX/d\lambda$ of the distance X to the wavelength $\lambda$ is expressed by the product of the radius of curvature $f_o$ of the end face of the slab waveguide and the dispersion $d\phi/d\lambda$ of the diffraction angle $\phi$ with respect to the wavelength $\lambda$. The relationship among the dispersion $d\phi/d\lambda$, the refractive index $n_s$ of the slab waveguide, the refractive index $n_c$ of the channel waveguide and the difference $\Delta L$ between the waveguide lengths of the channel waveguides satisfies the following equation which has already been explained and is given again.

$$(d\phi/d\lambda)=(\Delta L/n_s \cdot D \cdot \lambda_M) \times \{n_c - \lambda_M \cdot (dn_c/d\lambda)\}$$

While the optical multiplexer/demultiplexer causes signal beams to be entered at the position U apart by a distance w from the center of the input end face 10y of the input-side slab waveguide 10 in order to correct the deviation $\delta\lambda_o$ of the center wavelength as mentioned above, the ratio $w/\delta\lambda_i$ between the distance W and the amount of correction $\delta\lambda_i$ to be given to the wavelength of the output optical signal corresponds to the dispersion $dX/d\lambda$ of the distance X in the equation (2). Therefore, the ratio $w/\delta\lambda_i$ can be expressed by the product of the dispersion $d\phi/d\lambda$ of the diffraction angle $\phi$ and the radius of curvature $f_i$ of the output end face of the input-side slab waveguide. That is, the following equation is satisfied.

$$w/\delta\lambda_i = \{(f_i \Delta L)/(n_s \cdot D \cdot \lambda_M)\} \times \{n_c - \lambda_M \cdot (dn_c/d\lambda)\} \quad (4)$$

$$w = R - \Delta R \quad (5)$$

From the equation (4), we obtain $$(R-\Delta R)/\delta\lambda_i = \{(f_i \Delta L)/(n_s D \lambda_M)\} \times \{n_c - \lambda_M (dn_c/d\lambda)\} \quad (6)$$

By substantially changing the value of $\Delta R$ in the equation (6) continuously, the deviation of the center wavelength $\delta\lambda_o$ can be canceled out substantially.

$$\delta\lambda_i = \delta\lambda_o \quad (7)$$

A description will now be given of specific procedures of correcting the deviation of the center wavelength.

In FIG. 3, first, a measurement is taken on the size of the deviation of the center wavelength $\delta\lambda_o$ when signal beam 20 is input to the reference input waveguide 3a of the optical multiplexer/demultiplexer. Even if the signal beam 20 enters a plurality of channel waveguides 7a at equi-phases (equi-phase plane 21) after being diffracted in the input-side slab waveguide 10, when the core width and refractive index of the channel waveguides 7a are deviated from the designed values, the optical signal with the center wavelength $\lambda_M$ is focused at, for example, the position T shifted from the center O of the output end face of the output-side slab waveguide 12 to the right. In this case, the equi-phase plane 22 is inclined by an angle $\alpha$ counterclockwise in FIG. 3 with respect to an equi-phase plane 22a observed in the case of the optical signal being focused at the center O of the output end face, so that optical signal of the center wavelength $(\lambda_M + \delta\lambda_o)$ shifted by $\delta\lambda_o$ from the originally designed value is output from the output waveguide 5a connected to the center O of the output end face.

As understood from the above, when the center wavelength is shifted to the direction to become larger than the predetermined wavelength $\lambda_M$, the amount of deviation from the designed value of the center-wavelength optical signal to be emitted from the output waveguide 5a connected to the center O of the output end face of the slab waveguide 12 is sequentially measured while the signal beams are sequentially input to the three correction input waveguides 3b provided to the left to the reference input waveguide 3a and the input waveguide 3b that minimizes the amount of deviation is selected.

In the preferred embodiment illustrated in FIGS. 1–3, wavelength-multiplexed signal beams can be input via the proper one of the correction input waveguides 3b formed on both sides of the reference input waveguide 3a so that even when the amount of deviation of the center wavelength varies slightly from $\delta\lambda_o$, this variation can be corrected.

In the example shown in FIG. 3, the intermediate correction input waveguide 3b connected to the position U deviated to the left from the center of the input end face 10y of the input-side slab waveguide 10 is selected, the signal beams are incident to the position U of the input-side slab waveguide 0 and its equi-phase plane 21a is tilted by the angle $\alpha$ clockwise in FIG. 3 with respect to the equi-phase plane 21 of optical signal coming from the reference input waveguide 3a. In this case, as mentioned above, the amount of correction $\delta\lambda_i$ to be given to the output optical signal takes a value whose sign differs from that of the amount of deviation of the center wavelength $\delta\lambda_o$ but has substantially the equal size, so that the wavelength deviation $\delta\lambda_o$ is canceled out and the optical signal with the center wavelength $\lambda_M$ is output from the output waveguide 5a connected to the center O of the output end face of the output-side slab waveguide 12.

The above example has been described with reference to the case where the amount of deviation of the center wavelength is $\delta\lambda_o$ (>0) when wavelength-multiplexed signal beams are input from the reference input waveguide 3a. When the size and direction of the deviation from the desired center wavelength $\lambda_M$ are different from those of the above-described example, however, the wavelength deviation can be corrected by using the proper one of the correction input waveguides 3b which provide different optical signal incident positions (the distances from the connecting portion between the reference input waveguide 3a and the input-side slab waveguide 10), i.e., different amounts of correction of the wavelength $\delta\lambda_i$.

That is, as has already been discussed, with respect to each of the correction input waveguides 3b, the inclination angle $\theta_1$ of the output end face 3s, the refractive index $n_1$ of the waveguide 3b, the refractive index $n_2$ of the cladding layer, and the separation distance G between the output end face 3s of the waveguide 3b and the input end face 10a of the slab waveguide 10 can be set adequately, so that the distance ΔR from the intersecting position between the optical axis of the correction input waveguide 3b and the input end face 10a of the slab waveguide 10 to the signal beam incident position U, i.e., the amount of correction of the wavelength deviation $\delta\lambda_i$ can be set substantially continuously. By selecting one of the correction input waveguides 3b, therefore, it is possible to provide the amount of correction $\delta\lambda_i$ which minimizes the wavelength deviation $\delta\lambda_o$ and preferably just cancel out the wavelength $d\delta\lambda_o$ (equations (6) and (7)).

Although the foregoing description has mainly explained the demultiplexing function to cause the wavelength-multiplexed signal beams from the input waveguide (first waveguide) 3a or 3b to be incident to the input-side slab waveguide (first slab waveguide) 10 and acquire optical signals having different wavelengths from a plurality of output waveguides (second waveguides) 5, the optical multiplexer/demultiplexer of this invention also demonstrates, based on its operational principle of reciprocity, the multiplexing function to cause signal beams to be incident to the input waveguides or the output waveguides and acquire wavelength-multiplexed signal beams from the input waveguides or the output waveguides.

EXAMPLE

The arrayed waveguide grating optical multiplexer/demultiplexer shown in FIG. 1 was prepared by forming, on the silicon substrate 1, the input waveguide 3a, a plurality of correction input waveguides 3b, the input-side slab waveguide 10, the arrayed waveguide grating 7 comprising a plurality of channel waveguides 7a, the output-side slab waveguide 12 and a plurality of output waveguides 5 using quartz-based glass. Note that the reference input waveguide 3a is connected to the input end face 10a of the input-side slab waveguide 10 and the correction input waveguides 3b are set apart from the input end face 10a.

The difference in waveguide length between the adjacent channel waveguides 7a was set to 65 μm, the interval between the waveguides was set to 15 μm, the radius of curvature of the slab waveguides 10 and 12 was set to 9 mm and the interval between the adjacent output waveguides 5 was set to 20 μm.

First, as the optical signal having a wavelength of 1551.32 nm was input to the reference input waveguide 3a of this optical multiplexer/demultiplexer, the center wavelength of the optical signal to be output from the output waveguide 5a was shifted from the designed value by 0.04 nm.

Next, to acquire such an incident position of optical signal to the slab waveguide 10 as to cancel out the deviation of the center wavelength, optical signal was input to each of the correction input waveguides 3b and the same evaluation was made. The individual correction input waveguides 3b were arranged at equi-distances and the angle θ defined by their output end faces and the planes perpendicular to the optical axes of the waveguides were changed in the range of 10° to 80°. The distance between the output end face and input end face 10a was set to 100 μm.

The wavelength of the center-wavelength optical signal output from the output waveguide 5a when optical signal was input to each correction input waveguide 3b was measured. The deviation of the center wavelength was minimized and became 0.00 nm when optical signal was input to the position separate by 1 μm from the center of curvature 10y of the input-side slab waveguide 10.

This invention is not limited to the above-described preferred embodiment and example, but can be modified in various forms.

Although a total of six correction input waveguides 3b are provided on both sides of the reference input waveguide 3a, for example, the number of the correction input waveguides 3b arranged is not limited to 6, but the correction input waveguides 3b can be formed only on one side of the reference input waveguide 3a. Further, it is not essential to connect the output end face 3s of the reference input waveguide 3a to the input end face 10a of the slab waveguide 10, and may be arranged apart from the input end face 10a. Although the output end face 3s of the correction input waveguide 3b is formed obliquely so that the reference input waveguide 3a side comes closer to the input end face 10a of the input-side slab waveguide 10 ($\theta_1 > 0$) and optical signal is input to an inner position from the location of the waveguides 3b as seen in the widthwise direction of the input-side slab waveguide 10 in the above-described preferred embodiment, the output end face 3s may be formed in such a way that its portion opposite to the reference input waveguide 3a comes closer to the input end face 10a of the input-side slab waveguide 10 ($\theta_1 < 0$) and the optical signal incident position comes outside of the location of the waveguides as seen in the widthwise direction of the slab waveguide.

What is claimed is:

1. An optical multiplexer/demultiplexer having a substrate on which an arrayed waveguide grating comprised of a plurality of waveguides having waveguide lengths different from one another, first and second slab waveguides respectively connected to both ends of the grating, a plurality of first waveguides adapted to output an optical signal toward the first slab waveguide, and a plurality of second waveguides adapted to receive an optical signal output from the second slab waveguide are formed, the improvement comprising:

at least one of said plurality of first waveguides having a slab-waveguide-side end face placed thereof apart from a first-waveguide-side end face of said first slab waveguide and obliquely extending at an acute angle to an optical axis of said at least one of said plurality of first waveguides as viewed in a plane.

2. The optical multiplexer/demultiplexer according to claim 1, wherein an optical transmission medium is disposed between said slab-waveguide-side end face of said first waveguides and said first-waveguide-side end face of said first slab waveguide, and said optical transmission medium is formed of a material having a slightly smaller refractive index than those of materials for said plurality of waveguides of said arrayed waveguide grating, said first and second slab waveguides and said plurality of first and second waveguides.

3. The optical multiplexer/demultiplexer according to claim 1, wherein a grating-side end face of said first slab waveguide is formed into an arc shape as viewed in a plane and has a center of curvature thereof set at a center portion of said first-waveguide-side end face of said first slab waveguide, and a grating-side end face of said second slab waveguide is formed into an arc shape as viewed in a plane and has a center of curvature thereof set at a center portion of a second-waveguide-side end face of said second slab waveguide.

4. The optical multiplexer/demultiplexer according to claim 3, wherein said first-waveguide-side end face of said first slab waveguide is formed into an arc shape as viewed in a plane and has a center of curvature thereof set at a center portion of said grating-side end face of said first slab waveguide, and said second-waveguide-side end face of said second slab waveguide is formed into an arc shape as viewed in a plane and has a center of curvature thereof set at a center portion of said grating-side end face of said second slab waveguide.

5. The optical multiplexer/demultiplexer according to claim 1, wherein said plurality of first waveguides include a first waveguide serving as a reference and adapted to output optical signal toward a center portion of said first-waveguide-side end face of said first slab waveguide, and at least one first waveguide for correcting a wavelength deviation.

6. The optical multiplexer/demultiplexer according to claim 5, wherein said first waveguide serving as a reference is connected to said center portion of said first-waveguide-side end face of said first slab waveguide.

7. The optical multiplexer/demultiplexer according to claim 5, wherein said plurality of first waveguides include a plurality of first waveguides for correcting a wavelength deviation, provided on both sides of said first waveguide serving as a reference as seen in a widthwise direction of said first-waveguide-side end face of said first slab waveguide.

8. The optical multiplexer/demultiplexer according to claim 5, wherein said at least one first waveguide for correcting a wavelength deviation has a slab-waveguide-side end face thereof placed apart from said first-waveguide-side end face of said first slab waveguide and obliquely extending at an acute angle to the optical axis of said first waveguides as viewed in a plane, and that side of said slab-waveguide-side end face of said first waveguide for correcting a wavelength deviation which is closer to said first waveguide serving as a reference as seen in a widthwise direction of said first slab waveguide is closer to said first-waveguide-side end face of said first slab waveguide as seen in a lengthwise direction of said first slab waveguide.

* * * * *